United States Patent [19]

Nelson

[11] Patent Number: 5,490,226
[45] Date of Patent: Feb. 6, 1996

[54] ZERO HOLDING POWER DIGITAL OPTICAL SWITCHES

[75] Inventor: William H. Nelson, Grafton, Mass.

[73] Assignee: GTE Laboratories Incorporated, Waltham, Mass.

[21] Appl. No.: 153,244

[22] Filed: Nov. 16, 1993

[51] Int. Cl.$^6$ .............................. G02B 6/26; G02B 6/10
[52] U.S. Cl. .................. 385/16; 385/14; 385/15; 385/39; 385/40; 385/45; 385/131; 385/132
[58] Field of Search .......................... 385/14, 15, 16, 385/18, 22, 24, 31, 39, 40, 45, 129, 130, 131, 132

[56] References Cited

U.S. PATENT DOCUMENTS 4,846,540  7/1989  Kapon ................................ 385/132 X

OTHER PUBLICATIONS

Soole, J. B. et al. "Fast high–efficiency integrated waveguide photodetectors using novel hybrid vertical/butt coupling geometry" Applied Physics Letters, vol. 61 No. 1 pp. 13–15 Jul. 6, 1992.
Fouckhardt, H. et al "All–Optical switching in waveguide X junctions" Journal of the optical Society of America B (Optical Physics) vol. 7 No. 5 pp. 803–809 May 1990.
Silberberg, Y. et al. "All–optical phase–and power–controlled switching in nonlinear waveguide junctions" Optics Letters, vol. 13, No. 12, pp. 1132–1134, Dec. 1988.
Friberg, S. R., et al. "Femtosecond switching ina dual–core–fiber nonlinear coupler", Optics Letters, vol. 13, No. 10 pp. 904–906, Oct. 1988.
Stegeman, G. I. et al. "Nonlinear all–optical guided–wave devices: operating characteristics and material trade–offs," Proceedings of SPIE–The International Society of Optical Engineering, vol. 864 pp. 24–34 1988 (No Month).
Silberberg, Y. et al, "All–optical switching in nonlinear wavehuide junctions", CLEO 88: Conference on Lasers and Electro–Optics. 1988 Technical Digest Series, vol. 7 (No Month).
Silberberg, Y. et al. "Digital Optical Switch" Applied Physics Letters vol. 51 No. 16 pp. 1230–1232 Oct. 19, 1987.
Thurston R. W. et al. "Analysis of mode separation in multichannel branching waveguides", IEEE Journal Of Quantum Electronics vol. QE–23, No. 8 pp. 1245–1255 Aug. 1987.
Friberg, S. R. et al. "Ultrafast all–optical switching ina dual–core fiber nonlinear coupler," Applied Physics Letters, vol. 51, No. 15 pp. 1135–1137 Oct. 12, 1987.

Primary Examiner—Brian Healy
Attorney, Agent, or Firm—Victor F. Lohmann, III; Lawrence E. Monks

[57] ABSTRACT

A Y-junction optical switch includes an input branch and two output branches optically coupled to the input branch at a junction. A single one of the output branches has an electrode. The two output branches are designed to have dissimilar optical refractive indices under a non-biasing condition.

1 Claim, 8 Drawing Sheets

ZERO HOLDING POWER DIGITAL OPTICAL SWITCHES

FIELD OF THE INVENTION

The present invention relates to optical switching and, more particularly, to Y-junction digital optical switches.

1. Cross-References to Related Applications

This application is related to copending application entitled "OPTIMIZED ELECTRODE GEOMETRIES FOR DIGITAL OPTICAL SWITCHES" filed simultaneously herewith by the same inventor and assigned to the same assignee as the instant application, herein incorporated by reference.

2. Background of the Invention

The shift to optical fiber as the preferred transmission medium in telecommunications has created the need for practical optical switches to perform the routing and distribution functions in the optical network. One category of optical switches is the waveguide spatial switch that selectably transfers an incoming optical signal to a specific one of a plurality of output waveguides, and is controlled by an externally applied electrical control signal without regard to the particular spectral or informational content of that signal. An optical spatial switch generally functions in one of three modes: (1) as a direct coupler switch by splitting single polarization monochromic light and recombining it constructively in the proper channel and destructively in the others; (2) as a gain switch by splitting the light and subsequently absorbing it in the unwanted channels, while amplifying it in the desired channel to compensate for the splitting loss; or (3) as an index switch by either focusing or reflecting the optical energy into the appropriate output channel.

However, a number of factors limit the performance of these different switches. For example, optical switches that depend upon mechanical or thermal mechanisms for switching are too slow for general use in a telecommunications network.

Direct coupler switches are critically dependent on the length of the active interference region for complete switching. They must be fabricated for operation at a particular wavelength and polarization, which eliminates use in a multi-wavelength network, or a network in which the polarization varies. Gain switches suffer from the high power requirements and complexity of the fast optical amplifiers in the output channels as well as spontaneous emission build up when used serially, which must be turned on for amplification or off for absorption.

An index switch can be fabricated to reflect or to focus light by changes in the index of refraction, where the index change is accomplished by either injecting or depleting electrical carriers in the switching region. The depletion mode of operation suffers from polarization sensitivity since the depletion region's large electrical field couples to the material's electro-optic coefficients.

Conventional optical index switches require electrodes on each output branch to effect index changes so that a propagation tendency in the higher index branch will result due to asymmetric adiabatic modal evolution. However, these index switches require stringent fabrication procedure and tolerances to minimze any coupling between the electrodes, particularly in the interaction region at the waveguide junction. Moreover, index switches require continuous electrical power to remain in a particular switching state.

SUMMARY OF THE PRESENT INVENTION

An optical switch, comprising an input branch for receiving an optical signal a first output branch optically coupled to the input branch and having a refractive index; a second output branch optically coupled to the input branch, having an electrode disposed thereon, and having a refractive index in an unbiased state which is different than the refractive index of said first output branch.

DETAILED DESCRIPTION OF THE PREFERRED EMBODIMENTS

Figure 1:
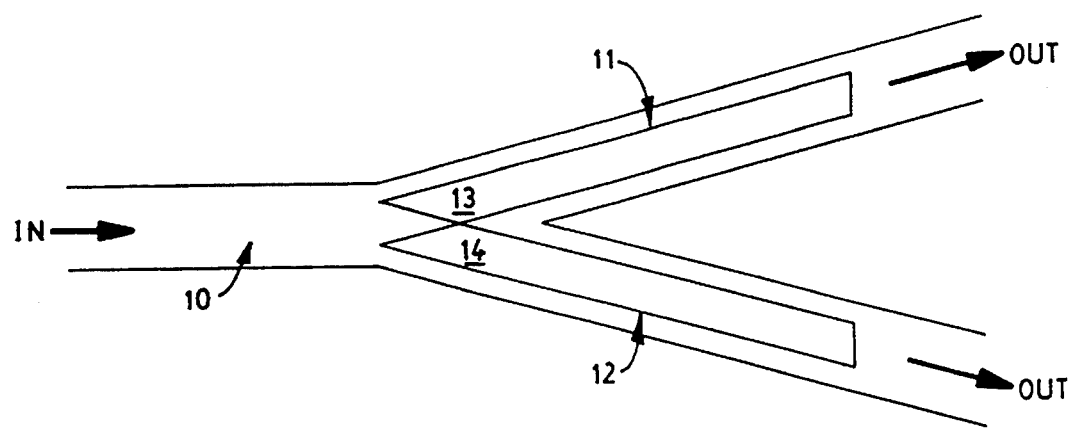
FIG. 1 is an upper plan view of a prior art optical switch.

FIG. 1 shows a prior art Y-junction optical switch with input branch 10 and output branches 11 and 12. The switch is constructed from a symmetric optical waveguide device which splits all of the bound optical modes equally between the output branches. By adding electrodes 13 and 14 to output branch waveguides 11 and 12, respectively, an asymmetry may be created between the refractive indices of the output waveguides with appropriate biasing, thereby rendering the optical device capable of adiabatic operation characterized by propagation of light in the fundamental and higher even-numbered modes down the output branch with the larger effective optical index, and propagation of light in the odd-numbered modes down the output branch with the smaller effective optical index. Thus, an asymmetric splitter is intrinsically digital if it contains only even or odd modes. The asymmetry is produced by injecting or depleting carriers with a forward or reverse bias to lower or elevate the refractive optical index of the waveguide. In the forward biased case, the injected current density holds the optical index to a lower value in the nonpropagating waveguide ("OFF" side of the switch), while in the reverse biased case, the voltage depleting the carrier density holds the optical index to a higher value in the propagating waveguide ("ON" side of the switch).

However, a clear disadvantage of these dual electrode optical switches is that energy must be continually applied to at least one of the electrodes in the form of a forward or reverse bias, as the case may be, to maintain the device in a particular switching state. Moreover, as noted above, the depletion mode suffers from polarization sensitivity. The device may also exhibit problems due to cross-coupling of the electrodes at the junction region.

The present invention is directed to an optical switch wherein an index asymmetry exists between output branches during unbiased operation. The asymmetry is produced by designing one output branch to be geometrically dissimilar to the other branch such that the branches exhibit different refractive indices. The index difference is characterized as passive index asymmetry since the asymmetry exists during normal operation (e.g., no biasing or other control signal). Accordingly, since the ON-OFF outputs are defined by the asymmetry during normal operation, only one of the branches needs an electrode to facilitate the appropriate biasing for reversing the asymmetry and switching the outputs. The switch relies upon adiabatic modal evaluation to create a natural digital switching mechanism in which the input optical signal propagates entirely into the branch of higher relative refractive index.

The optical switch structure of the present invention includes an input branch optically coupled to two output branches wherein one of the branches is characterized by a waveguide structure modified relative to the other branch waveguides to create a geometrically induced, effective optical index asymmetry. For purposes of clarity, the branch considered to have the modified structure does not have an electrode and is referred to as the passive branch. In contrast to the prior art, which accomplishes switching by biasing the electrodes provided to both branches for inducing the appropriate asymmetry, the present invention provides an electrode to only one of the output branches.

If the passive output branch has a refractive optical index larger than the other output branch during normal, unbiased operation, the passive branch will function as the normally-ON output pursuant to asymmetric adiabatic modal evolution. In order to switch the output from the passive branch to the electroded branch, the index asymmetry must be reversed so that the refractive index of the electroded branch is larger than that of the passive branch. The change in asymmetry is accomplished by applying an appropriate reverse bias voltage to the electroded branch to sufficiently deplete electrical carriers in the electroded waveguiding structure and increase the optical index to a level greater than the passive branch so that optical switching occurs.

Alternatively, if the passive branch has a lower refractive optical index than the electroded branch during normal operation, the passive branch will function as the normally-OFF output. In order to reverse the asymmetry, and consequently switch the output channel to the passive branch, the electroded branch is forward biased to inject sufficient electrical carriers and consequently lower its optical index to an appropriate level so that the passive branch will exhibit the higher index.

Figure 2:
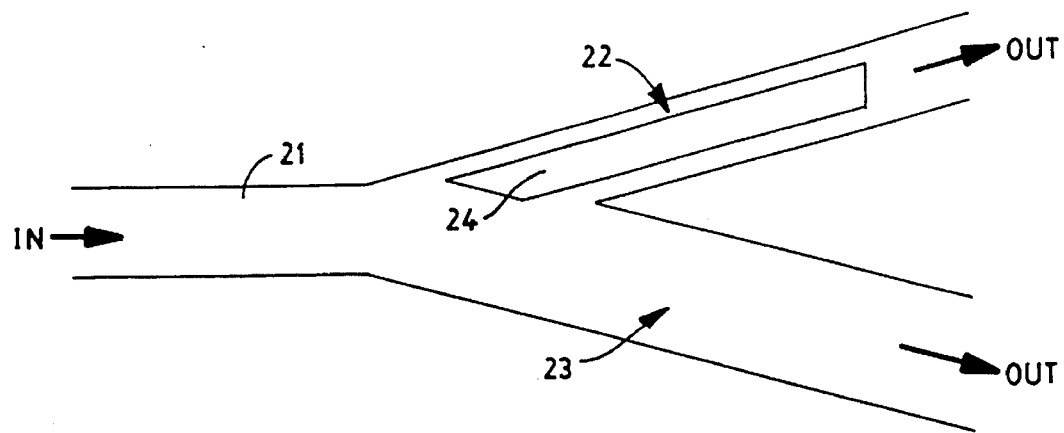
FIG. 2 is an upper plan view of an optical switch in accordance with a first embodiment of the present invention.

FIG. 2 illustrates a digital optical switch in accordance with a first embodiment of the present invention. The switch includes a generally Y-shaped ridge waveguide structure having an input branch 21 and two output branches 22 and 23 diverging from an intersection region. A natural index asymmetry is produced by constructing branch 23 to have a wider ridge waveguide structure than branch 22, thereby creating a larger effective optical index in branch 23. Consequently, when the switch remains in an unbiased state, branch 23 is the normally-ON output.

The switching capability is implemented with electrode 24 fabricated on top of branch 22. In particular, to switch the light propagation from branch 23 to branch 22, a reverse bias is applied to electrode 24 to sufficiently deplete the electrical carrier density in the underlying waveguide structure of branch 22 so that the refractive index is increased beyond that of waveguide 23. Its great advantage, in this case, is that it only has to have a sufficient difference in the output branches optical indices to be asymmetric, and then all the light travels down just one output branch. The optical index in an output branch does not have to be held exactly at some special value, or pushed all the way to matching the waveguide's cladding index, to extinguish that waveguide branch. Once the index asymmetry is reversed, adiabatic modal evolution will produce optical propagation into branch 22, thereby switching the output.

Figure 3:
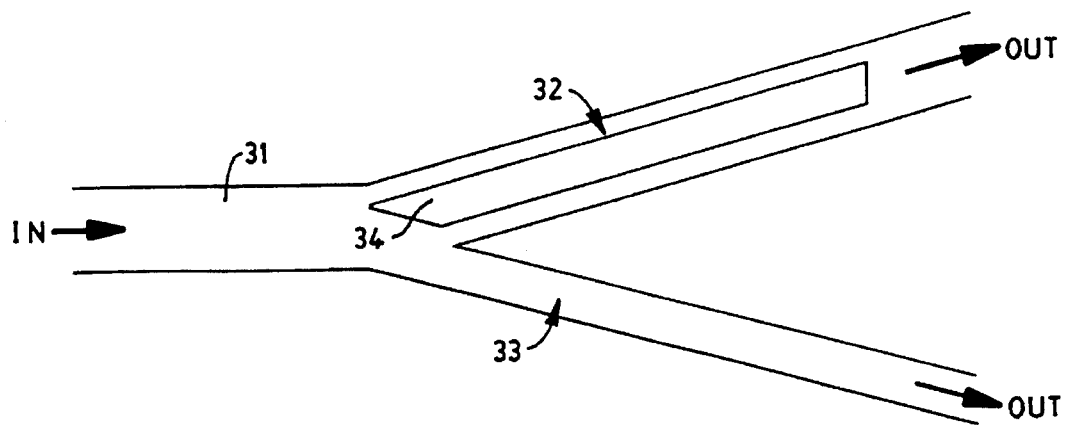
FIG. 3 is an upper plan view of an optical switch in accordance with a second embodiment of the present invention.

In accordance with a second embodiment of the present invention, FIG. 3 shows a Y-junction optical structure having an input branch 31 with output branches 32 and 33. A passive index asymmetry is established between the output branches by designing the waveguide structure of branch 33 to be narrower than that of branch 32. Accordingly, branch 33 exhibits a smaller effective optical index, and functions as the normally-OFF output. The switching function is performed by forward biasing electrode 34 fabricated on an upper surface of branch 32, thereby injecting electrical carriers into the underlying waveguide structure. A sufficient forward bias must be applied to adequately lower the index of branch 32 so that branch 33 will have the higher relative optical index.

Figure 4:
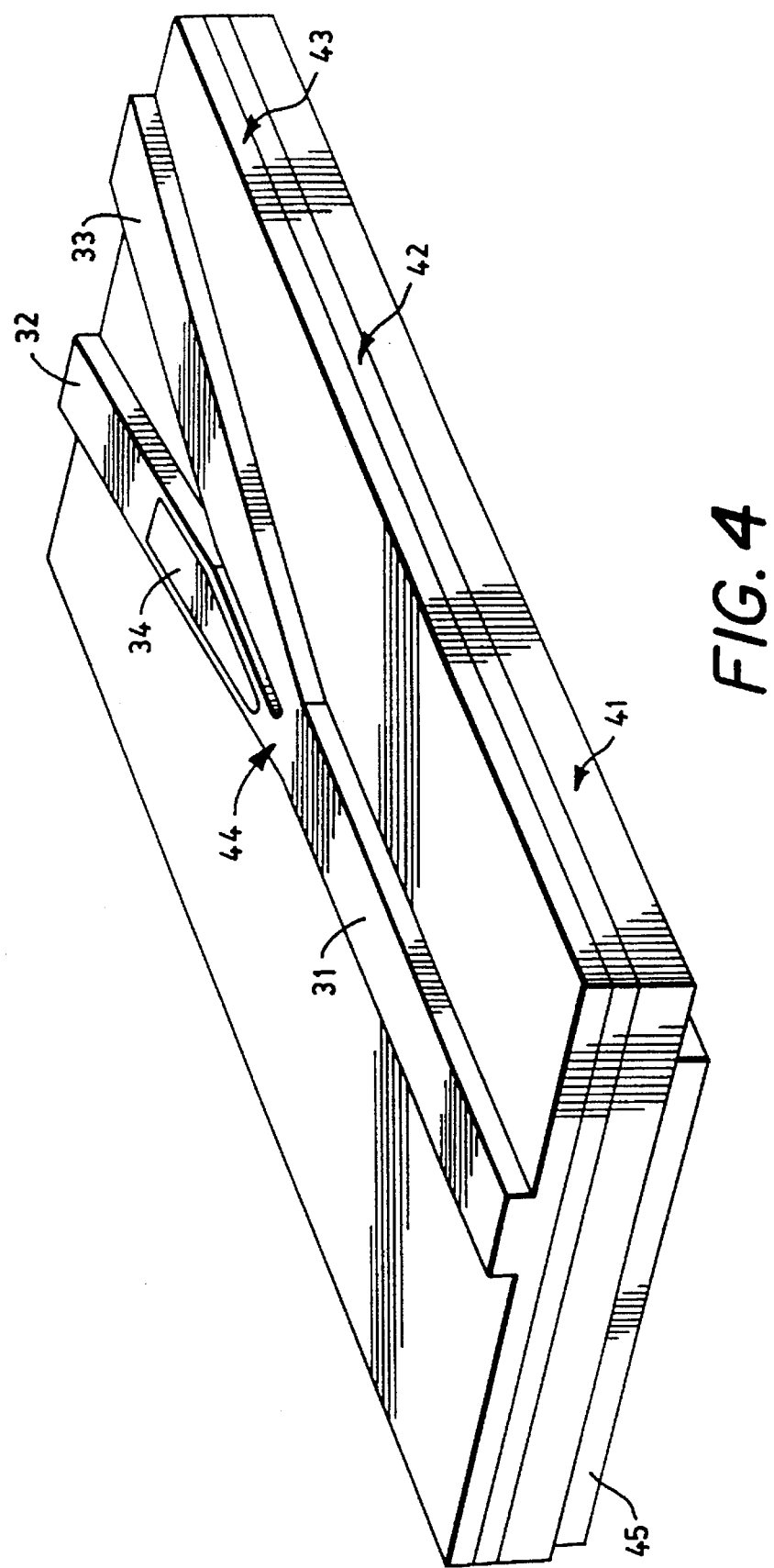
FIG. 4 is an upper perspective view of the optical switch disclosed in FIG. 3.

FIG. 4 shows a perspective view of the optical structure in FIG. 3, where similar structures are labeled with identical numerical references. The structure includes a substrate region 41, a transparent guiding layer 42, and a cladding region 43. A gap 44 at the intersection region serves to minimize any interaction between electrode 34 and branch 33. A ground electrode 45 is disposed on the underside of the device.

Figure 5A:
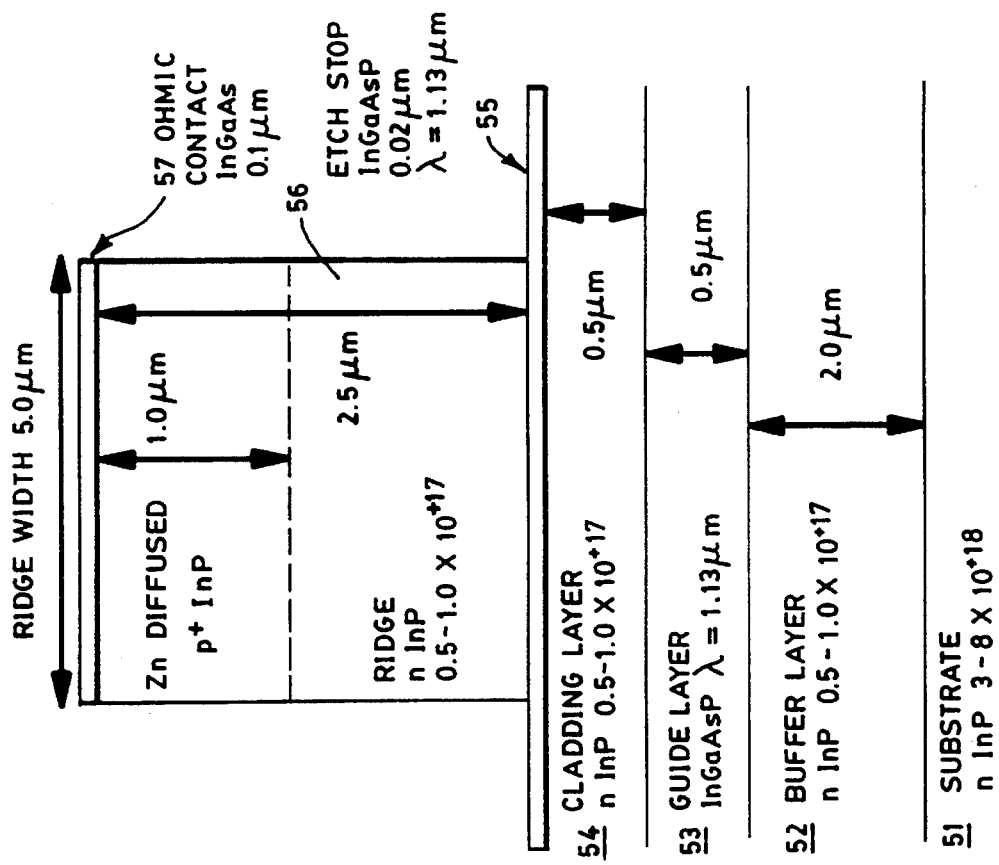
FIGS. 5(a) and 5(b) represents cross-sectional views of a ridge waveguide structure and transmitted modal intensity graph respectively, to illustrate the epitaxial layering for an implementation of the present invention.
Figure 5B:
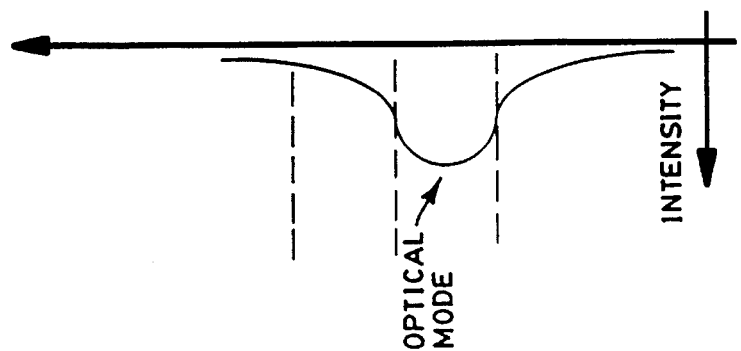

FIGS. 5(a) and 5(b), including the waveguide structure and transmitted modal intensity graph respectively, illustrates the epitaxial layering for a heterostructure implementation of the present invention.

Lateral optical confinement is provided by 5 μm wide ridge waveguides, which intersect to form a Y-junction with opening angles such as ½°, 1°, and 2°. At the point where the output waveguides branch, a 1μm wide trench is etched to isolate the two distinct ridges, and to reduce any coupling from the single electrodes. The depth of the p-n junction is a fraction of the ridge height for transverse current confinement. The pn-junctions, and the single electrode, may extend the complete length of the output branches. Consequently, current is injected well beyond the active switching region, and is larger than would be required in an optimized structure. The separation of the waveguides is 30 μm at the output.

The epitaxial layer structure of the switch is grown by either halide VPE or MOCVD on an n+—InP substrate 51. A 2.0 μm thick InP buffer layer 52 is deposited first, followed by a 0.5 μm thick InGaAsP ($\lambda$=1.1 μm) guiding layer 53. A 0.02 μm thick InGaAsP ($\lambda$=1.1 μm) etch stop layer is sandwiched between two InP cladding layers 54 and 56 having thicknesses of 0.5 μm and 2.5 μm respectively, to control the thickness of the thinner cladding layer over the length of the active region. The layers are capped by a 0.1 μm thick InGaAs layer 57 to facilitiate ohmic contact. All of the InP layers are sulphur doped to approximately $1 \times 10^{17}$ cm$^{-3}$, while the other layers are undoped.

The p-n junction in the output branching region of the optical switch is formed by selective area Zn diffusion in closed evacuated ampules using a $Si_3N_4$ mask and a $ZnP_2$+P (red) source. The diffusion is conducted at 500° C. for 15 to 30 minutes, depending upon the required depth. A combination of reactive ion etching (CH$_4$/H$_2$) and wet chemical etching (H$_3$PO$_4$:HCl=9:1) is used to fabricate the Y-branching waveguide ridges. A heat-treated polymide layer is applied to planarize the surface, followed by a Ti/Au metal evaporation to form the electrode and contact pads. The substrate is then thinned to approximately 100 μm, and a Ti/Au back ohmic contact is formed. After sintering the metal contacts at 400° C. for 20 seconds, the wafer may be cleaved into bars of Y switches having different branching angles, for example.

The optical switch in accordance with FIG. 1 was tested to evaluate its performance. It is expected that the results indicated below will also be demonstrated in the switches of the present invention when the effective refractive index of the switch having geometrical index asymmetry is equivalent to the effective index arising in the FIG. 1 switch.

Figure 6:
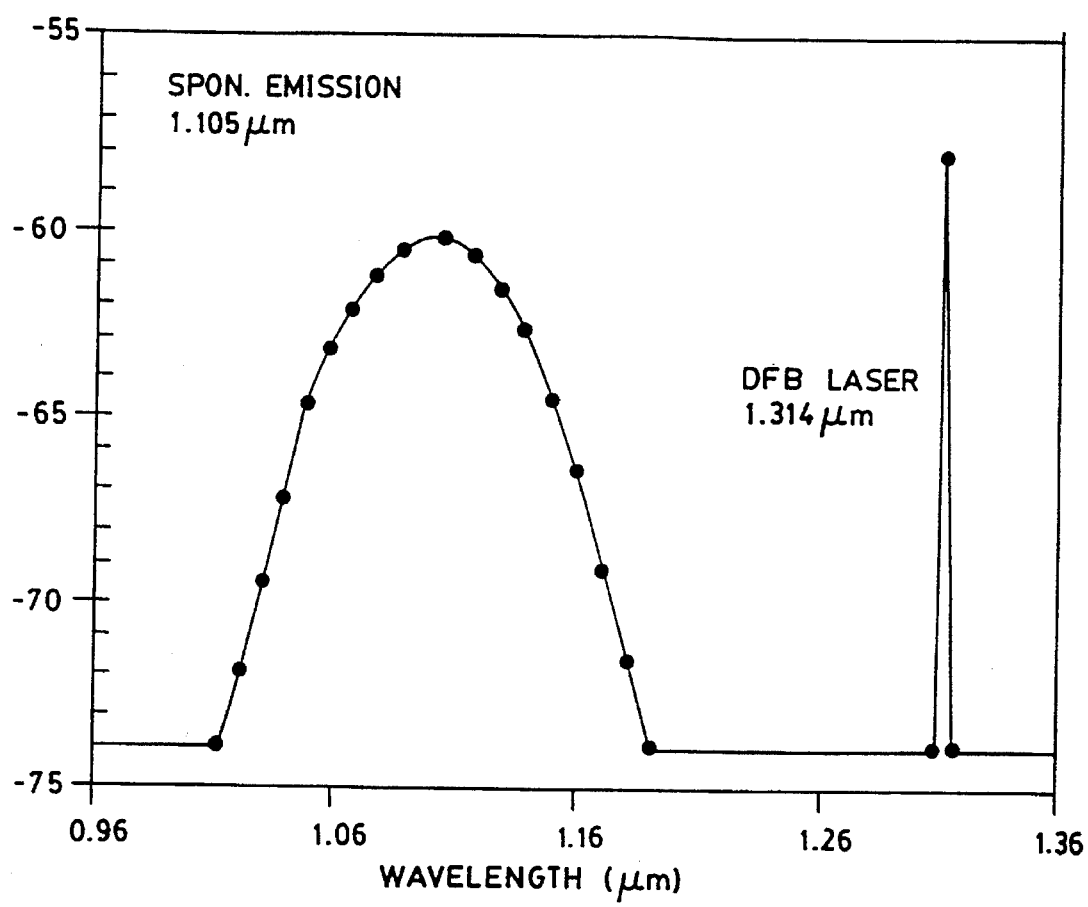
FIG. 6 illustrates the optical spectrum from a switch according to the present invention.
Figure 7A:
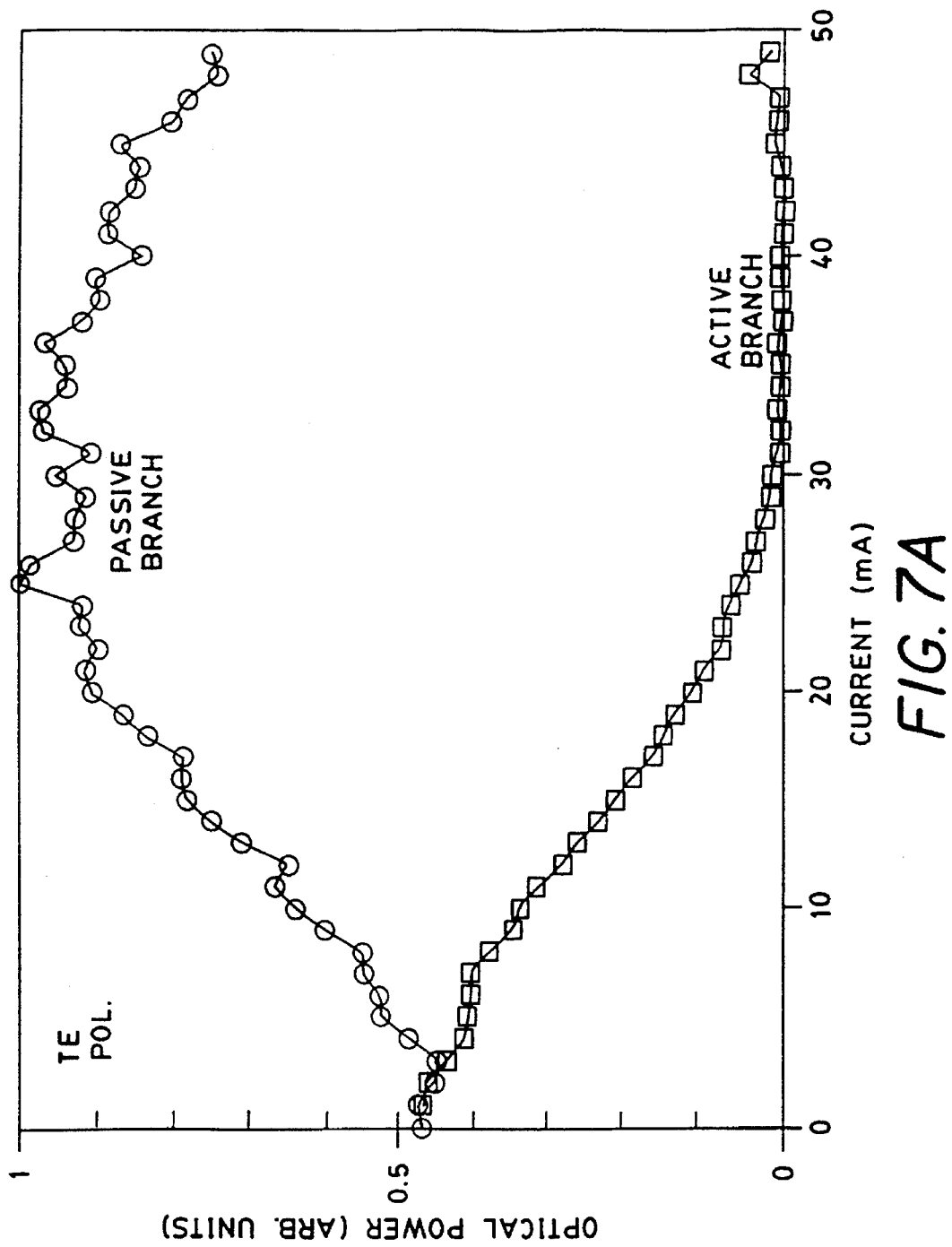
FIGS. 7A and 7B represent the switching curves of a Y-junction optical switch according to the present invention for TE and TM polarization, respectively.
Figure 7B:
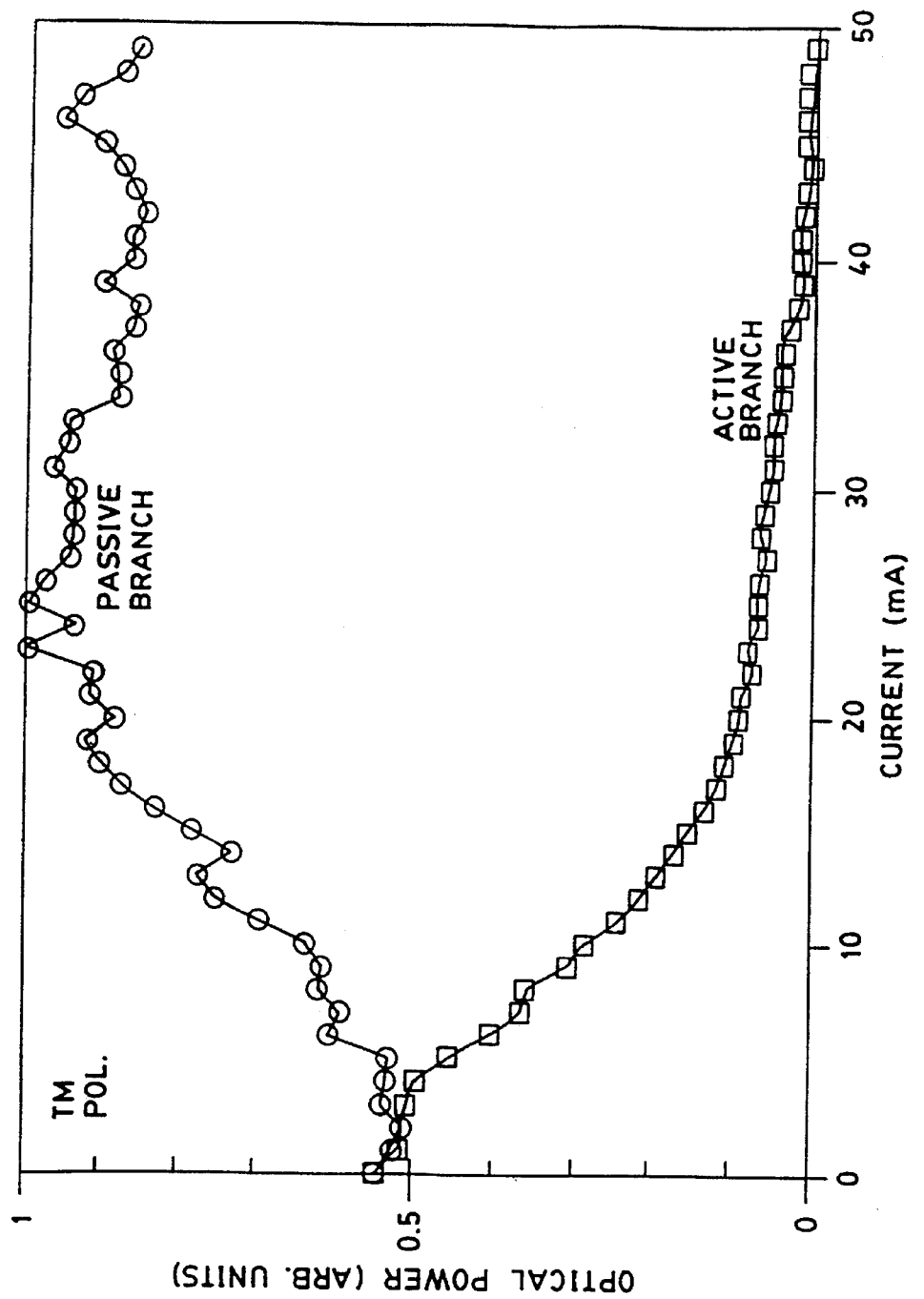
Figure 8A:
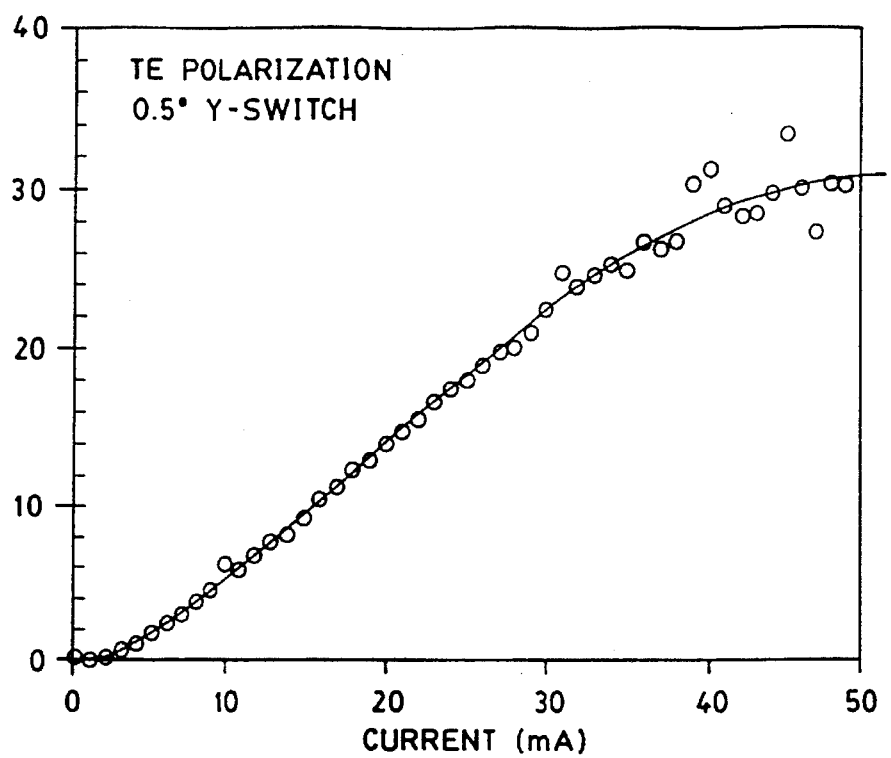
FIGS. 8A and 8B depict the extinction ratio of a Y-branching switch according to the present invention for TE and TM polarization, respectively.
Figure 8B:
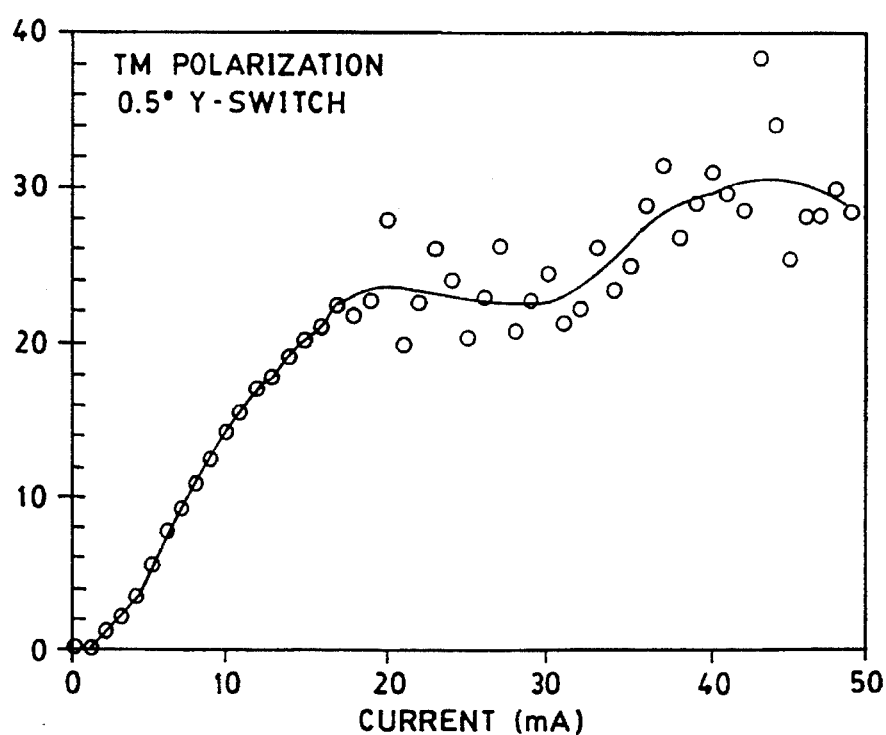

Light from a variable wavelength source is coupled into the input waveguide by a tapered fiber, and the output light from one output branch of the switch is coupled into a second tapered fiber and measured with a wide area detector. Loss values are obtained from Fabry-Perot fringes produced by varying the wavelength of the input light. The optical effective index of the guided mode under the active electrode is decreased by current injection under forward bias. The induced index asymmetry produces a shift of the light to the output branch with the larger effective index. The spontaneous emission spectrum from the active layer of the propagating waveguide is shown in FIG. 6. The switch is characterized at 1.3 μm for both TE and TM polarizations. The switching curves of a ½° Y-junction as a function of the current intensity injected into the active branch, for both TE and TM input polarizations, is shown in FIGS. 7A and 7B, respectively, where an extinction ratio of better than 20 dB is achieved. The extinction ratio for another ½° Y-junction switch as a function of injected current for TE and TM polarization is shown in FIGS. 8A and 8B, respectively.

As alternative configurations for the embodiments described above, the electrode may be disposed on the passive output branch waveguide. For example, in the embodiment of FIG. 3 where branch 33 is the normally-OFF output, electrode 34 would now be disposed on branch 33. The switching functionality remains the same, however, since branch 33 continues as the normally-OFF output, although switching now occurs by applying the appropriate reverse bias to electrode 34 to deplete sufficient carriers in the branch 33 waveguide and elevate the optical index above that of branch 32. The same alternative configuration may be applied as well to the FIG. 2 switch.

The specific geometrical parameters indicated above to induce the natural index asymmetry between the output branch waveguides is presented for illustrative purposes only, and should not serve as a limitation of the present invention. The difference in refractive index, characterized as passive index asymmetry since the differences exist in the absence of any applied control signal to effect either forward or reverse biasing, may be produced by any other geometric, structural or compositional variation whose physical effect is to have one branch waveguide exhibit a refractive index different than the other branch waveguide. For example, the geometry of the layering may be modified, independently or in combination with variations in the ridge waveguide width.

In summary, the optical index switch is the only one which meets the requirements of the optical communications network for speed, wavelength insensitivity, and intrinsic low power consumption. In addition, for polarization insensitive switching, the optical index switch must be operated by injection. Thus a zero holding power, either normally-on or normally-off, digital optical switch results, which is especially valuable for intermittent use in routing control, network reconfiguration, or network testing, where the switch is in the passive state most of the time, at no cost in electrical power consumption. This reduction in duty cycle:— (1) allows the use of a smaller, lower cost, power supply to operate the switch; (2) requires less cooling since the switch has lower average electrical power consumption; (3) gives a longer lifetime; and (4) leads to greater reliability.

While there has been shown and described herein what are presently considered the preferred embodiments of the invention, it will be obvious to those skilled in the art that various changes and modifications can be made therein without departing from the scope of the invention as defined by the appended claims.

What is claimed is:

1. An optical switch, comprising:
   an input branch including a ridge waveguide heterostructure for receiving an optical signal;
   a first output branch optically coupled to the input branch and having a ridge waveguide heterostructurea refractive index;
   a second output branch optically coupled to the input branch, having an electrode disposed thereon for energizing said second output branch, and having a refractive index in an unbiased state which is different than the refractive index of said first output branch;
   wherein the refractive index of said second output optical waveguide means is selectively modified, responsive to said electrode, for switching said optical signal between the first output branch and the second output branch, and
   wherein the respective ridge waveguide heterostructures of said input branch, first output branch, and second output branch each comprise:
   an InP substrate;
   an InP buffer layer disposed on the substrate;
   an InGaAsP guiding layer disposed on the buffer layer and having a propagation wavelength of lambda= 1.13 μm;
   an InP cladding layer disposed on the guiding layer;
   an InGaAsP etch stop layer disposed on the cladding layer; and
   an InP cladding layer disposed on the etch stop layer.

* * * * *